(12) United States Patent
Bennett et al.

(10) Patent No.: US 8,828,522 B1
(45) Date of Patent: Sep. 9, 2014

(54) DOOR AND WALL PROTECTION STRUCTURES AND MATERIAL FOR PRODUCING THE SAME

(75) Inventors: Matthew G. Bennett, New Berlin, WI (US); Kevin Diels, Muskego, WI (US)

(73) Assignee: InPro Corporation, Muskego, WI (US)

( * ) Notice: Subject to any disclaimer, the term of this patent is extended or adjusted under 35 U.S.C. 154(b) by 678 days.

(21) Appl. No.: 13/048,460

(22) Filed: Mar. 15, 2011

Related U.S. Application Data

(60) Provisional application No. 61/314,023, filed on Mar. 15, 2010.

(51) Int. Cl.
  *B32B 3/20* (2006.01)

(52) U.S. Cl.
  USPC .......................................... 428/188; 428/68

(58) Field of Classification Search
  CPC ..... E04F 13/073; E04F 13/0733; E04F 13/06;
    E04F 19/02; B65D 2581/053; B65D
    2581/058; B65D 85/48; B65D 65/466; B65D
    65/46; B42P 2241/28; B65F 2250/105;
    C09D 167/00; C08G 18/4269; C08G 63/916;
    C08G 63/78; C08G 67/04; C08G 63/785;
    C08L 67/04; C08L 67/06

USPC ............ 428/68, 188; 528/271, 272; 525/418,
  525/437; 52/287.1, 288.1; 206/453; 40/778
See application file for complete search history.

(56) References Cited

U.S. PATENT DOCUMENTS 7,368,511 B2 * 5/2008 Hale et al. .................... 525/411

FOREIGN PATENT DOCUMENTS

CN 101429328 A * 5/2009

OTHER PUBLICATIONS

Wang, Q., CN101429328A, translated abstract.*

* cited by examiner

*Primary Examiner* — Catherine A Simone
(74) *Attorney, Agent, or Firm* — Boyle Fredrickson, S.C.

(57) ABSTRACT

The invention relates to a composition for use in the production of an article of manufacture, and in particular, to the manufacture of wall and corner guards. The composition includes a biopolymer in combination with PETG as well as a modifier. The biopolymer and modifier are preferably produced from an annually renewable source such as corn or sugar as opposed to traditionally used petroleum based plastics. In this manner, the composition of the invention is relatively environmentally friendly as compared to known compositions while maintaining many of the desirable qualities thereof. In addition, the production of the articles of manufacture results in the consumption of fewer fossil fuels and less production of pollutants.

13 Claims, 7 Drawing Sheets

DOOR AND WALL PROTECTION STRUCTURES AND MATERIAL FOR PRODUCING THE SAME

CROSS-REFERENCE TO RELATED APPLICATIONS

This application claims benefit of provisional application No. 61/314,023 filed on Mar. 15, 2010 and entitled "Door and Wall Protection Structures and Material for Producing the Same."

FIELD OF THE INVENTION

This invention relates to door and wall protection structures, and, more particularly, to a material for constructing door and wall protection structures from.

BACKGROUND OF THE INVENTION

It is often desirable to provide wall and door mounted structures for protecting the door and wall from general wear and tear often experienced by high traffic areas. For instance, such structures are commonly used in schools, hospitals, nursing homes, and other settings where there is a large amount of pedestrian traffic such that the walls and doors experience a relatively high amount of wear and tear as compared to less trafficked areas. Further, large equipment is typically moved in and out of hallways and doors of these locations, which may cause the doors and walls to experience additional wear and tear. For example, in hospitals, patient beds, gurneys, wheel chairs, mobile imaging equipment, and the like are often moved from one place to another and in doing so often unintentionally impact the walls and doors in the areas which they travel past. Accordingly, these locations often employ protection structures such as wall and door guards to protect against this wear and tear.

Wall and door guards used in such applications are typically constructed from vinyl or other plastic materials. The production of such materials is often associated with the production of a relatively large amount of pollutants. Moreover, such processes typically utilize a number of chemicals and other hazardous materials that may be harmful to the environment. For instance, known materials typically include halogens, sulfur, nitrogen, lead, mercury, cadmium, hexavalent chromium, or other known materials that may have an adverse impact on the environment.

Thus, a material for constructing wall and door guards that is capable of protecting walls and doors from wear and tear but which is more environmentally friendly is desired.

SUMMARY OF THE INVENTION

According to one aspect of the invention, a composition and method for producing the composition is provided to form a composition having an improved environmental impact as compared to materials typically used to construct wall and door guards.

The composition of the present invention may include a biopolymeric component, a polyethylene terephthalate (PET) copolymer, and a modifier component. The PET copolymer may include polyethylene terephthalate glycol (PETG). The biopolymer may be PLA or some similar material. The modifier of the composition may comprise approximately 20% of the composition. The PETG component may comprise approximately 60% of the composition. The PLA component may be provided in approximately 20% of the composition. Of course, the composition may be modified to include more or less of any of the foregoing components or to add additional components.

The composition of the present invention may be utilized for the molding or otherwise constructing of an article of manufacturing such as, for example, a wall or corner guard. The wall or corner guard may include a base and a cover. The base may be constructed out of a relatively sturdy material such as a metal like aluminum or the like. The cover may be slidingly coupled to the base so as to selectively cover the base. The cover is constructed from the material of the present invention. In this manner, the cover is constructed so as to provide protection to the walls and surrounding areas of a given location during use thereof. At the same time, the composition of the material of the present invention is such that it is generally more environmentally friendly. Finally, a method of forming the article may include the steps of providing a biopolymer component, a PET copolymer component and a modifier component in combination with one another to form the material of the present invention. The method may further include the steps of providing an additive component for enhancing a characteristic of the material. For instance, the additive component may be one of a colorant, a flame retardant, a UV stabilizer, matting agent, and a slip agent.

Numerous other aspects, features and advantages of the invention will be made apparent from the following detailed description.

DETAILED DESCRIPTION OF THE INVENTION

The present invention is a material for extruding wall and door guards that comprises the same durability and other characteristics of traditional materials such as vinyl and other such known materials, but which is produced, at least in part, from a renewable source and, and wherein the production of the composition utilizes less fossil fuel and releases fewer amounts of greenhouse gasses than comparable petroleum-based plastics.

Figure 1:
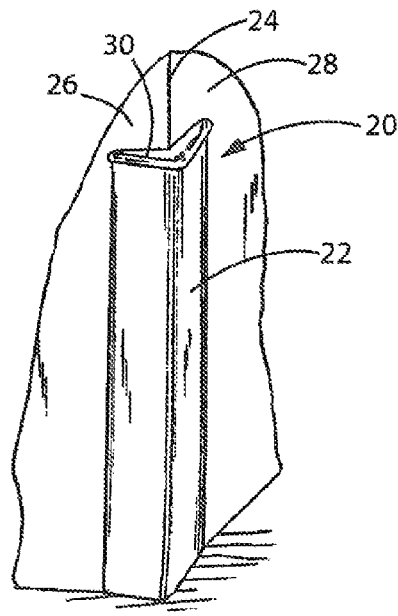
FIG. 1 is an isometric view of a corner guard constructed in accordance with the present invention mounted to a corner of a wall.

Referring to the drawings, and initially to FIG. 1, an exemplary corner guard assembly 20 constructed in accordance with the present invention is illustrated. Corner guard assembly 20 includes a protective element 22 coupled around a corner 24 joining two walls 26, 28 together. As shown, corner guard assembly 20 extends upwardly from the floor surrounding corner 24 and terminates in an upper cap 30 that is secured over an upper edge of the protective element 22. Cap 30 may be generally sized and shaped to cover the upper edge of the corner guard element such that the rear side of the corner guard assembly 20 is generally concealed. Corner guard assembly 20 may have a height sufficient to accommodate the passage of various transport assemblies such as wheelchairs, gurneys, hospital beds, portable monitoring equipment carts, and other such assemblies configured for transporting people or equipment. In this manner, the corner guard assembly 20 may protect the walls 26, 28 from accidental damage caused by such equipment striking the walls 26, 28. Of course, corner guard assembly 20 may extend along an entire height of the walls 26, 28 or just a portion. Further, corner guard 20, as illustrated, extends a predetermined distance onto each of the walls 26, 28 around corner 24. The distance about which corner guard assembly 20 extends onto each of the walls 26, 28 may be any distance desired and need not be disposed symmetrically across both of the walls 26, 28.

Figure 2:
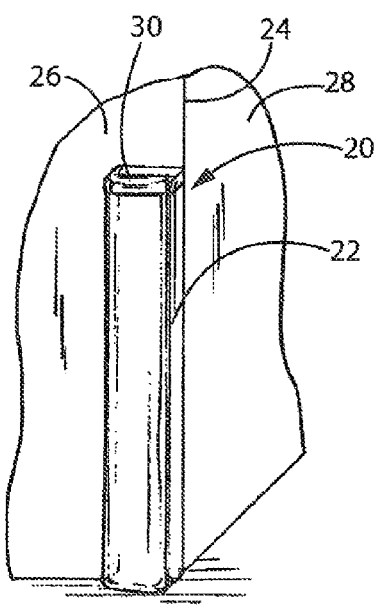
FIG. 2 is an isometric view of another construction of a corner guard constructed in accordance with the present invention.

Turning now to FIG. 2 another construction of a corner guard assembly 20 according to the present invention is illustrated. In the present construction, protective element 22 is coupled to wall 26 and extends along wall 26 and over corner 24 but does not extend onto wall 28. The corner guard assembly 20 of this construction includes a cap 30 and operates similarly to that of the previous construction.

Figure 3:
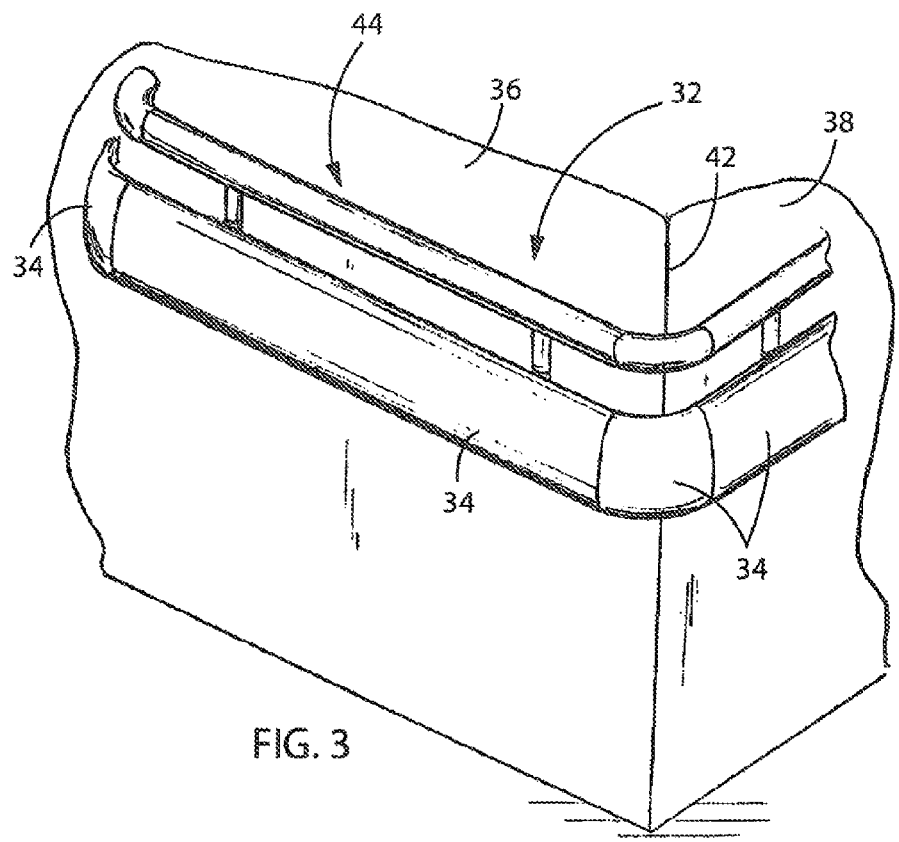
FIG. 3 is an isometric view of a wall and corner guard assembly constructed in accordance with the present invention.
Figure 4:
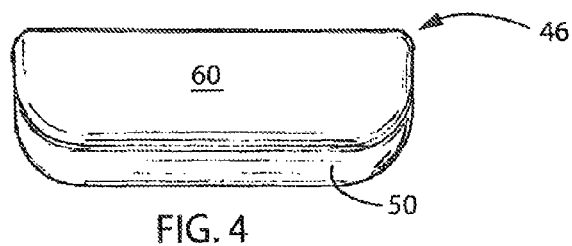
FIG. 4 is an end elevation view of a wall guard constructed in accordance with the present invention.
Figure 5:
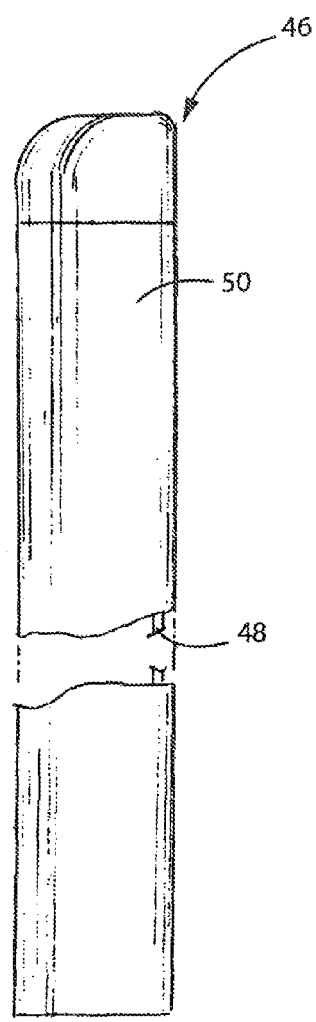
FIG. 5 is a side elevation view of the wall guard of FIG. 4.
Figure 6:
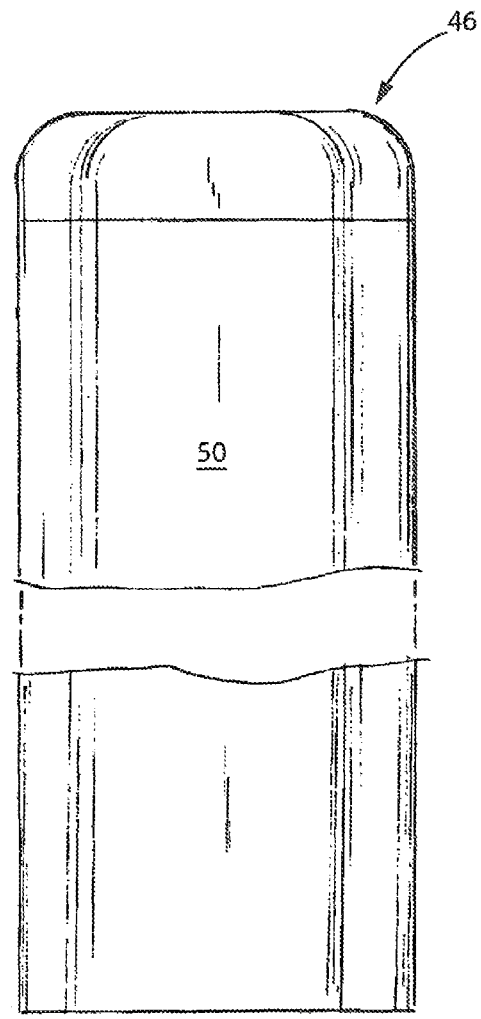
FIG. 6 is a top plan view of the wall guard of FIG. 4.
Figure 7:
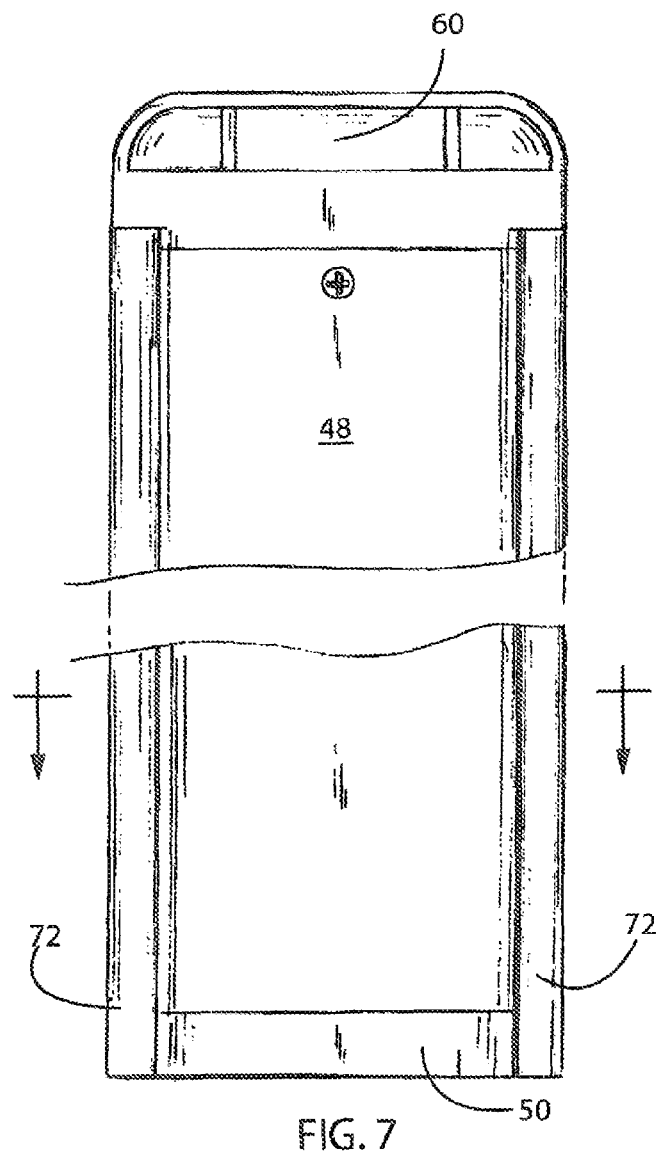
FIG. 7 is a bottom plan view of the wall guard of FIG. 4.
Figure 8:
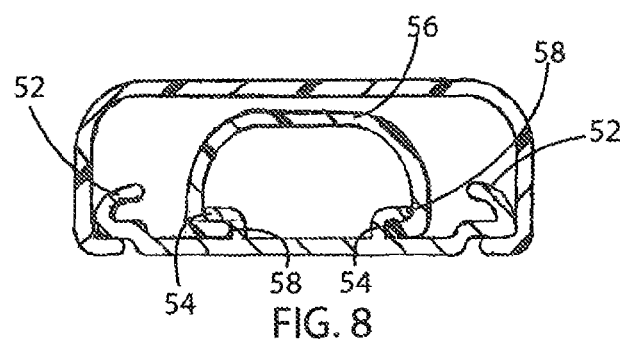
FIG. 8 is a cross-sectional view of the wall guard of FIG. 4.
Figure 9:
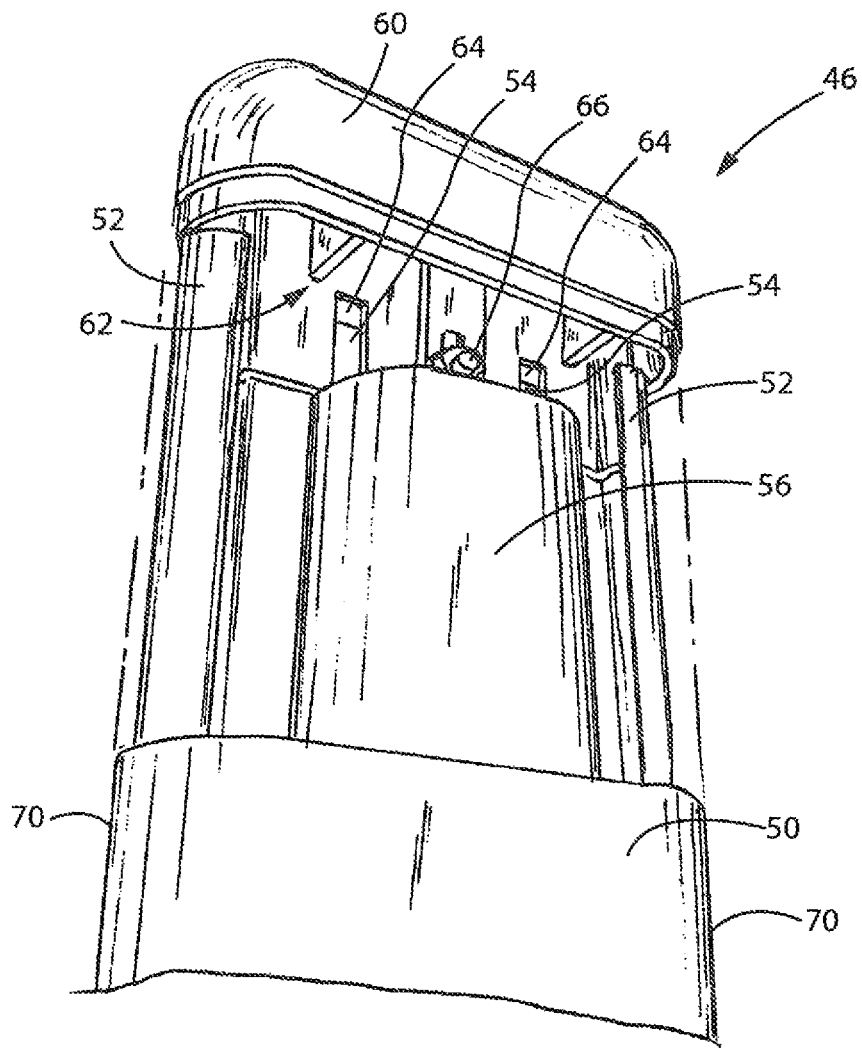
FIG. 9 is a partial isometric view of the wall guard of FIG. 4 illustrating a cover removed from a portion of a base thereof.
Figure 10:
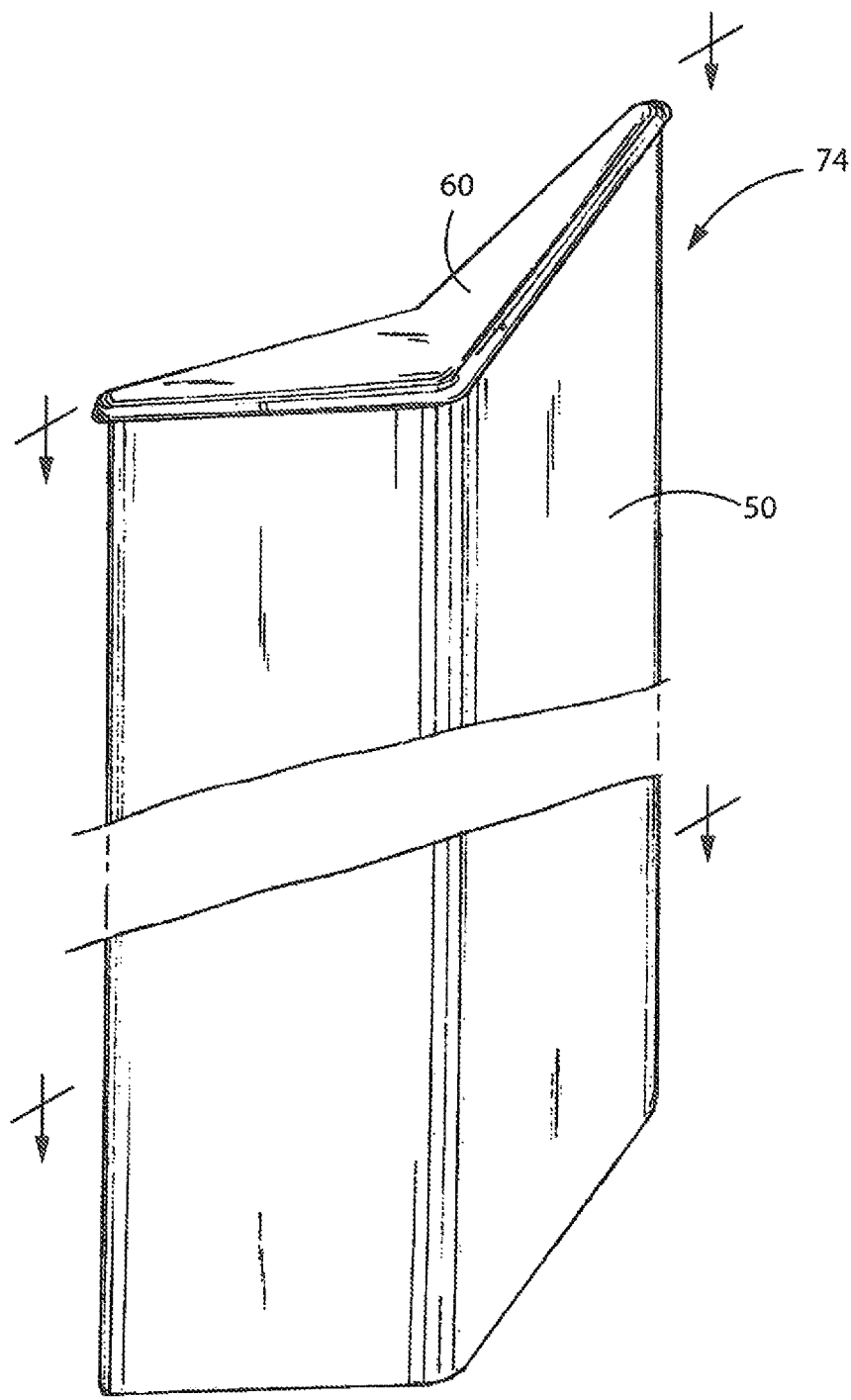
FIG. 10 is an isometric view of a corner guard constructed in accordance with the present invention.
Figure 11:
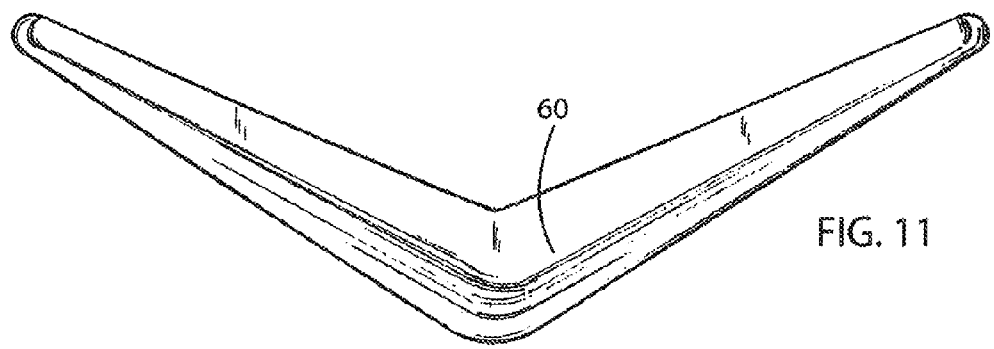
FIG. 11 is an end elevation view of the corner guard of FIG. 9.
Figure 12:
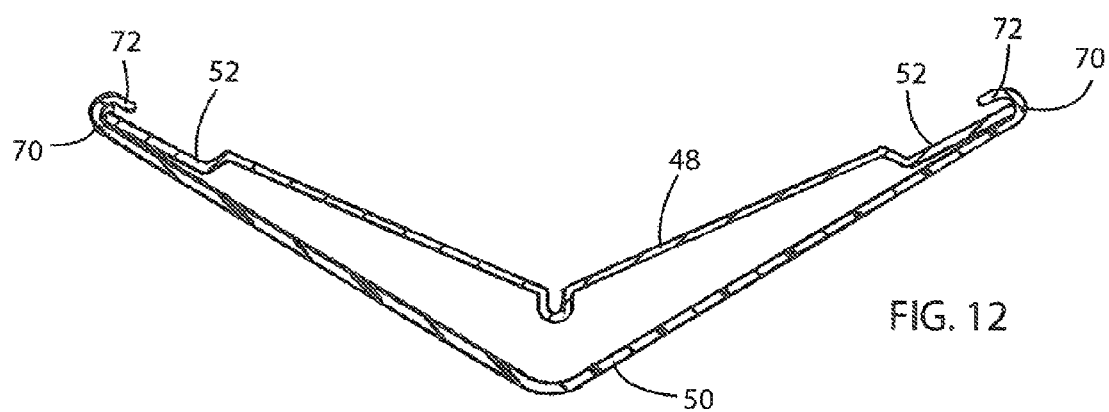
FIG. 12 is a cross-sectional view of the corner guard of FIG. 9 taken along line 9-9.
Figure 13:
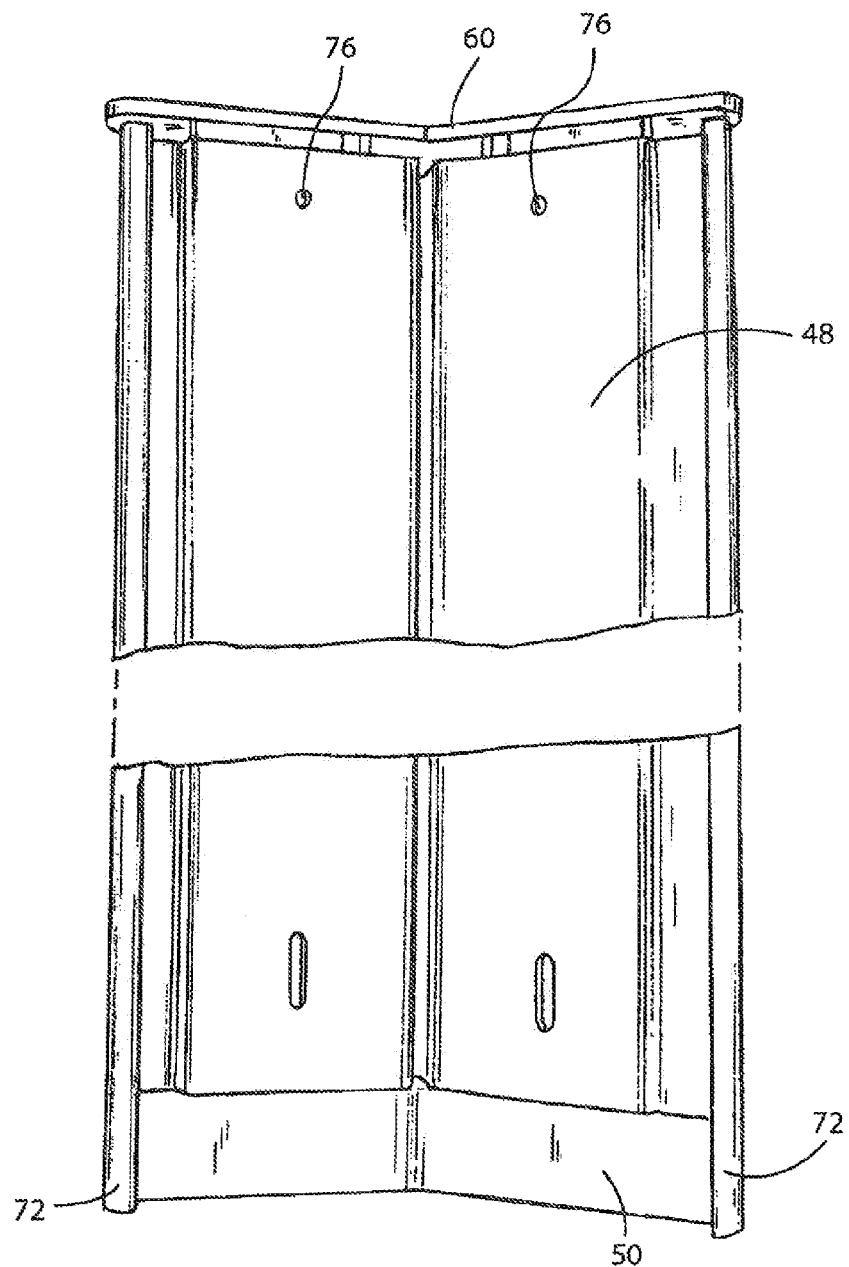
FIG. 13 is a bottom plan view of the corner guard of FIG. 9.

Referring to FIG. 3, a wall and corner guard assembly 32 according to the invention is illustrated. The wall and corner guard assembly 32 includes a number of generally elongate wall protective elements 34 that extend along a width of the walls 36, 38. The wall protective elements 34 are interconnected with a number of corner protective elements 40 that are configured to wrap around a corner 42 between walls 36, 38. Wall and corner guard assembly 32 of the present construction may incorporate a handrail assembly 44 as is generally understood. Handrail assembly 44 may be constructed like that disclosed in U.S. patent application Ser. No. 12/418, 303 filed on Apr. 3, 2009 and entitled "Handrail Assembly."

Referring now to FIGS. 4-8, an exemplary illustration of a wall guard 46 according to the invention is illustrated. Wall guard 46 includes a base 48 slidably coupled to a cover 50. Base 48 is generally flat in construction and may be constructed from a metal or similarly durable material configured to support the wall guard 46. Base 48 may include a pair of laterally positioned flanges 52 disposed on opposing sides thereof. Flanges 52 may extend generally upwardly from a lower edge of base 48 and may be generally configured for engaging a portion of cover 50 to allow base 48 to slide with respect thereto. Flanges 52 may extend along an entire length of base 48 or a portion thereof. Base 48 may include a pair of centrally disposed support elements 54 that extend along a length thereof. Elements 54 may be integrally formed with an upper portion of base 48 and may have a generally L-shaped cross-section or any other similarly suitable shape. Elements 54 may be configured to receive a reinforcing element 56. Reinforcing element 56 may have a generally C-shaped construction and include a pair of laterally disposed flanges 58 configured to engage elements 54. Element 56 may be generally configured to provide the cover 48 with additional structural support as will be discussed further. Element 56 may be constructed out of metal, plastic, or any other suitable material as desired.

Base 48 is secured to and carries an end member 60 configured to be positioned flush with respect to cover 50 as will be discussed. End member 60 serves as a cover to keep the base 48 hidden from view from an exterior of wall guard 46. End member 60 may include a generally rounded portion that is positioned flush with cover 50. The rounded portion of end member 60 terminates in a ledge that is undercut with respect to the rounded portion and configured to be received under cover 50. End member 60 further includes a mounting arrangement 62 that extends downwardly from the ledge thereof. Mounting arrangement 62 is secured to an upper face of base 48. Mounting arrangement 62 includes a number of grooves 64 configured to engage a portion of base 48 to thereby couple end member 60 to the base 48. In particular, mounting arrangement 62 includes a pair of laterally disposed grooves 64 that are configured to receive ends of support elements 54. Support elements 54 are secured within grooves 64 by way of a friction fit, adhesive, or any other such means known in the art. A centrally disposed groove 64 is configured to receive a fastener 66 therethrough. In particular, groove 64 may receive, for instance, the shank of a screw or similar element therethrough and a nut or the like may be received over the end of the screw. The fastener 66 may be received through the base 48 and secured through the groove 64 to thereby secure the end member 60 to the base 48.

Cover 50 of the wall guard 46 is constructed from a material according to the present invention as will be discussed herein. Cover 50 is generally C-shaped and includes a relatively flat surface 68 and a pair of rounded sides 70. Rounded sides 70 terminate in inwardly flanged ends 72 that extend along the length of cover 50 and are configured to engage the flanges 52 of the base 48. In particular, ends 72 are configured to slidably receive the respective flanges 52. In this manner the base 48 is slidable with respect to the cover 50 for assembling the wall guard 46. A number of alternative arrangements are considered to be within the scope of the present construction of wall guard 46, and the foregoing description is meant to be merely exemplary. It is understood that any number of traditional wall guard constructions are within the scope of the present invention, and the present invention need not be limited to the foregoing described construction.

Referring now to FIGS. 9-12, a corner guard 74 constructed from a material according to the present invention as will be discussed further herein is illustrated. The corner guard 74 is similarly constructed as compared to wall guard 46, and therefore, the foregoing description of the wall guard 46 is generally applicable to the corner guard 74. Corner guard 74 includes a base 48 and a cover 50. The base 48 and cover 50 are slidably engageable with one another. Base 48 includes an end member 60 secured by way of a fastener or other such arrangement. Base 48 is generally bent about a central axis extending along a length thereof. In this way, base 48 is configured to be received about a corner of a wall as is generally understood. Base 48 includes a pair of flanges 52 that are selectively engageable with cover 50 to enable base 48 to slide with respect the cover 50 for assembly of corner guard 74. Base 48 may include a mounting arrangement.

Cover 50 of corner guard 74 is sized and shaped to accommodate base 48 and includes a pair of rounded sides 70 that terminate in ends 72 extending along the length of the sides thereof for engaging the flanges 52 of base 48. Flanges 48 are thus slidably engageable with the ends 72 for sliding movement of the base 48 with respect to the cover 50. Cover 50 may be generally V-shaped to thereby be received around a corner of a wall much like base 48. In this manner, corner guard 74 may be coupled between a pair of adjacent walls around a corner thereof as shown, for example, in FIG. 1.

Base 48 may include an end 60 coupled thereto by a pair of fasteners, other mechanical or non-mechanical means. For instance, base 48 may include a pair of apertures 76 for receiving a pair of fasteners (not shown) to thereby couple the end 60 to the base 48 in much the same manner as illustrated in the previously discussed construction of the present invention.

The material of the invention includes Polyethylene Terephthalate Glycol (PETG) and a predetermined amount of recycled content in combination with a biopolymer, and in particular, polylactic acid (PLA) and a modifier.

The composition of the invention is particularly useful in that it maintains many of the characteristics of commonly used plastics such as vinyl while also having improved environmental characteristics in that the composition does not include halogens, lead, mercury, cadmium, hexavalent chromium, or BPA. The resulting material is NFPA class 1 fire rated such that it may be used in any number of applications.

The material of the invention includes a biopolymer that is biodegradable thermoplastic, aliphatic polyester derived from a renewable resource such as corn starch or sugar cane, though other annually renewable resources are within the scope of the present invention. The biopolymer of the invention may be polylactic acid (polylactide or PLA). PLA is generally compostable thereby providing a relatively environmentally friendly product. PLA is made primarily of polylactic acid, a repeating chain of lactic acid, which undergoes a two-step degradation process. The conversion of Lactide to Polylactide under the presence of a catalyst and heat is illustrated below.

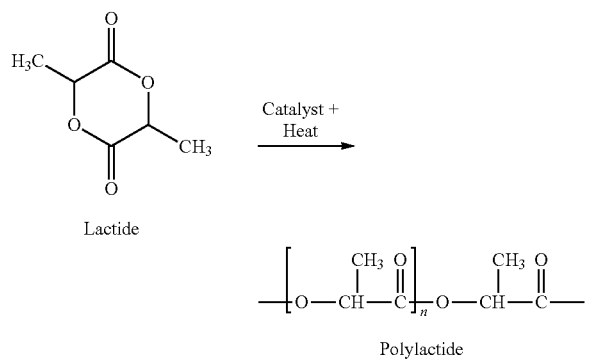

As is known in the art, PLA can be processed like most thermoplastics into fiber using conventional melt spinning processes and the like or a film. The melting temperature of PLA may be changed with the addition of another compound. The PLA used in the present invention may be that produced by NatureWorks®, though other producers may be utilized. Preferably, the PLA utilized in the preferred embodiment is preferably PLA Polymer 2002D sold by NatureWorks®.

The material of the invention additionally includes a PET copolymer such as PETG. PETG is a clear amorphous thermoplastic that can be injection molded or sheet extruded. PETG may also be colored during processing. As is generally understood, copolymers such as PETG are useful in molding applications such as thermoforming to make products such as tray and blister packaging from PETG film and PETG sheet. The PETG may be that produced by Eastman Chemical Company sold under the name Eastman Spectar™ Copolyester 14471 although other producers may be used for supplying the PETG of the invention.

The material of the invention further includes a modifier such as a flexible plastic for film extrusion and extrusion coating. In particular, the modifier of the invention should be biodegradable and have processing properties substantially similar to LDPE and LLDPE. Further, the material should require no pre-drying prior to extrusion thereof. The modifier may be ECOFLEX® F BX 7011 produced by BASF, REPRO, or a similar such composition.

One embodiment of the invention comprises approximately 60% PETG, 20% PLA, and 20% modifier such as ECOFLEX®. It is understood that these percentages are merely approximations and a range of varying concentrations of each of the components of the invention are contemplated and within the scope of the present invention. The resulting material of the invention should be relatively durable as compared to acrylic and similar such materials as well as comprise an excellent chemical resistance. The material further comprises easy, repeatable thermoforming capabilities, is relatively inflammable, and is relatively flexible.

To prepare the material of the present invention, the PETG, PLA, and modifier are mixed, blended or compounded together and extruded into a sheet or profile shape. The resultant material has a melting point of approximately 221 degrees Celsius (430 degrees Fahrenheit). The individual components are provided in a pellet form. The individual components are then dry blended at various rations right into the extruder, or alternatively, the individual components can be provided in pellet form and compounded together to form a single homogenous pellet comprising the three individual components of the invention. One advantage of compounding the individual components together rather than dry blending them into the extruder is that the resultant mixture is more thoroughly mixed to thereby allow for more consistent, reproducible processing for varying extrusion shapes. As is readily understood, additional components may be provided in the material of the invention such as, for example, color pellets to provide a resultant material having a different coloring. Likewise, flame retardants, UV-stabilizers, matting agent, slip agents, and the like may be included in the material of the invention.

One notable characteristic of the invention is that the PETG has a much higher melting temperature than the PLA or PLA modifier. Thus, as the materials are melted together, the tensile elongation experienced by the material is increased so as to provide an improved impact resistance as compared to prior art materials. In this manner, the addition of PETG to the PLA and modifier eliminates the rough edges often associated with a combination of PLA and a modifier. That is, when PLA and a modifier are combined, the resulting extrusion material has a lower melting point as compared to that of the invention with the addition of PETG. One problem associated with a lower melting point in an extruding material like that contemplated herein is that the edges of the material are susceptible to melting when an extrusion saw is applied to the material. As the material hardens the melting of the edges leaves behind rough areas around the edges. As is readily understood, providing an extruded material with rough edges is undesirable and thus the extruded material is either unusable or requires a great deal of finishing to remove the rough edges. This results in longer processing time and more wasted materials and thus greater expense.

Various alternatives are contemplated as being within the scope of the following claims particularly pointing out and distinctly claiming the subject matter regarded as the invention.

We claim:

1. A protective element comprising:
   a base; and
   a cover slidingly coupled to the base, wherein the cover is constructed from a material comprising,
      a PET copolymer;
      biopolymer; and
      a modifier.

2. The protective element of claim 1, wherein the base is selectively coupleable to a structure.

3. The protective element of claim 1, wherein the protective element is one of a wall guard and a corner guard.

4. The protective element of claim 1, wherein the base is constructed from a metal and includes a pair of longitudinally extending flanges disposed on opposite sides thereof, and wherein the cover includes a pair of rounded sides terminating in corresponding cover flanges configured to slidingly receive the flanges of the base for selective movement of the cover with respect to the base.

5. The protective element of claim 1, further comprising an end coupled to the base and configured to cooperate with the cover to define a generally planar front surface.

6. The protective element of claim 1, further comprising a reinforcing element coupled to the base and configured to reinforce the cover with respect to the base.

7. The protective element of claim 1, wherein the PET copolymer comprises PETG.

8. The protective element of claim 1, wherein the biopolymer is derived from one of a corn starch and a sugar cane.

9. The material of claim 1, wherein the biopolymer comprises biodegradable thermoplastic aliphatic polyester.

10. A material for use in forming an article comprising:
    a biopolymeric component that comprises PLA;
    a polyethylene terephthalate (PET) copolymer component that comprises polyethylene terephthalate glycol (PETG); and
    a modifier component that is present in an amount of approximately 20%.

11. The material of claim 10, wherein the PETG component is present in an amount of approximately 60%.

12. The material of claim 11, wherein the PLA is present in an amount of approximately 20%.

13. A material for use in forming an article comprising:
    a biopolymeric component;
    a polyethylene terephthalate (PET) copolymer component;
    a modifier component; and
    wherein the article formed of the material is further defined as at least one of a handrail, a door protective element, wall protective element, or a corner guard.

* * * * *